United States Patent
Reddy et al.

(10) Patent No.: US 10,112,170 B2
(45) Date of Patent: Oct. 30, 2018

(54) STABILIZED INORGANIC OXIDE SUPPORTS AND ADSORBENTS DERIVED THEREFROM FOR CARBON DIOXIDE CAPTURE

(71) Applicant: Reliance Industries Limited, Mumbai (IN)

(72) Inventors: Akuiri Satyanarayana Reddy, Guntur (IN); Surajit Sengupta, Kolkata (IN); Rajeshwer Dongara, Navi Mumbai (IN); Asit Kumar Das, Faridabad (IN); Vinay Amte, Durg (IN); Ashwani Yadav, Panchkula (IN); Pramod Kumar Bajpai, Patiala (IN); Haripada Bhunia, Patiala (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/124,696

(22) PCT Filed: Jan. 28, 2015

(86) PCT No.: PCT/IB2015/050636
§ 371 (c)(1),
(2) Date: Sep. 9, 2016

(87) PCT Pub. No.: WO2015/136390
PCT Pub. Date: Sep. 17, 2015

(65) Prior Publication Data
US 2017/0080400 A1    Mar. 23, 2017

(30) Foreign Application Priority Data
Mar. 14, 2014 (IN) .......................... 866/MUM/2014

(51) Int. Cl.
*B01J 20/08* (2006.01)
*B01J 20/28* (2006.01)
(Continued)

(52) U.S. Cl.
CPC ............ *B01J 20/041* (2013.01); *B01D 53/62* (2013.01); *B01D 53/8671* (2013.01);
(Continued)

(58) Field of Classification Search
CPC  B01J 20/08; B01J 20/28057; B01J 20/28061; B01J 20/28064; B01J 20/28069;
(Continued)

(56) References Cited

U.S. PATENT DOCUMENTS 3,163,612 A * 12/1964 Meisinger ................ B01J 21/02
                                                     273/DIG. 10
4,868,147 A *  9/1989 Pearson ................... B01J 20/08
                                                     502/231
(Continued)

FOREIGN PATENT DOCUMENTS

WO      2014015243 A1     1/2014

OTHER PUBLICATIONS

International Search Report issued in corresponding application No. PCT/IB2015/050636 dated Jul. 31, 2015 (3 pages).
(Continued)

*Primary Examiner* — Cam N. Nguyen
(74) *Attorney, Agent, or Firm* — Osha Liang LLP

(57) ABSTRACT

The present invention relates to a stabilized inorganic oxide support for capturing carbon dioxide from gases having high regeneration capacities over many cycles. The method for preparing the stabilized inorganic oxide support includes stabilizing an alumina-containing precursor by either calcining or steaming, impregnating an alkali or alkaline earth compound into the stabilized alumina-and drying the alkali
(Continued)

Figure 1:
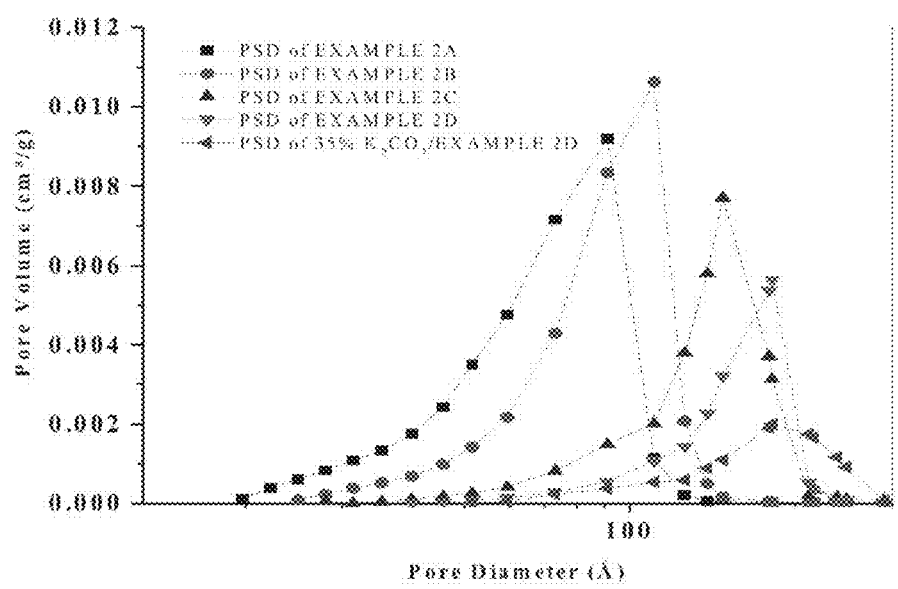

or alkaline earth compound-impregnated stabilized alumina. The stabilized inorganic oxide support can be regenerated at lower temperatures between 100 and 150° C. The carbon dioxide adsorption capacity of the regenerated support is between 70 and 90% of the theoretical carbon dioxide adsorption capacity.

16 Claims, 5 Drawing Sheets

(51) Int. Cl.
| | | |
|---|---|---|
| B01J 20/30 | (2006.01) | |
| B01J 20/32 | (2006.01) | |
| B01J 21/04 | (2006.01) | |
| B01J 23/02 | (2006.01) | |
| B01J 23/04 | (2006.01) | |
| B01J 23/12 | (2006.01) | |
| B01J 20/04 | (2006.01) | |
| B01D 53/62 | (2006.01) | |
| B01D 53/86 | (2006.01) | |
| B01J 20/34 | (2006.01) | |

(52) U.S. Cl.
CPC ......... *B01D 53/8681* (2013.01); *B01J 20/08* (2013.01); *B01J 20/2809* (2013.01); *B01J 20/28057* (2013.01); *B01J 20/28061* (2013.01); *B01J 20/28064* (2013.01); *B01J 20/28069* (2013.01); *B01J 20/28071* (2013.01); *B01J 20/28073* (2013.01); *B01J 20/28083* (2013.01); *B01J 20/3078* (2013.01); *B01J 20/3204* (2013.01); *B01J 20/3236* (2013.01); *B01J 20/3433* (2013.01); *B01J 20/3483* (2013.01); *B01J 23/04* (2013.01); *B01D 2251/306* (2013.01); *B01D 2251/606* (2013.01); *B01D 2253/104* (2013.01); *B01D 2255/2092* (2013.01); *B01D 2257/504* (2013.01); *B01D 2258/0283* (2013.01); *Y02C 10/04* (2013.01); *Y02C 10/08* (2013.01); *Y02W 10/33* (2015.05)

(58) Field of Classification Search
CPC ............ B01J 20/28071; B01J 20/28073; B01J 20/28083; B01J 20/2809; B01J 20/3078; B01J 20/3204; B01J 20/3236; B01J 21/04; B01J 23/02; B01J 23/04; B01J 23/12

See application file for complete search history.

(56) References Cited

U.S. PATENT DOCUMENTS

| | | | | |
|---|---|---|---|---|
| 5,180,703 | A * | 1/1993 | Ziebarth | B01D 53/02 502/243 |
| 5,427,995 | A * | 6/1995 | Ziebarth | B01D 53/02 502/407 |
| 5,585,082 | A * | 12/1996 | Ziebarth | B01D 53/02 423/235 |
| 6,777,373 | B1 * | 8/2004 | Carmello | B01J 23/72 502/341 |
| 7,314,847 | B1 | 1/2008 | Siriwardane | |
| 7,507,844 | B2 * | 3/2009 | Pak | B01J 21/04 502/180 |
| 7,714,152 | B2 * | 5/2010 | Pak | B01J 23/50 423/628 |
| 8,318,627 | B2 * | 11/2012 | Rizkalla | B01J 21/04 502/100 |
| 8,586,769 | B2 * | 11/2013 | Pak | B01J 23/688 502/347 |
| 8,618,017 | B2 * | 12/2013 | Kressmann | B01J 21/04 208/422 |
| 8,791,280 | B2 * | 7/2014 | Rizkalla | B01J 21/04 502/152 |
| 8,895,469 | B2 * | 11/2014 | Chen | B01J 21/04 502/100 |
| 9,144,793 | B2 * | 9/2015 | Li | B01J 21/04 |
| 9,321,035 | B2 * | 4/2016 | Suchanek | B01J 23/66 |
| 2007/0037702 | A1 * | 2/2007 | Prichett | B01D 53/02 502/415 |
| 2010/0179336 | A1 * | 7/2010 | Pak | B01J 23/50 549/534 |
| 2014/0241966 | A1 | 8/2014 | Khunsupat et al. | |

OTHER PUBLICATIONS

Written Opinion of the International Searching Authority issued in corresponding application No. PCT/IB2015/050636 dated Jul. 31, 2015 (8 pages).

U.S. Department of Energy, National Energy Technology Laboratory, "Appendix B: Carbon Dioxide Capture Technology Sheets"; Advanced Carbon Dioxide Capture R&D Program: Technology Update; May 2013 (558 pages).

* cited by examiner

US 10,112,170 B2

STABILIZED INORGANIC OXIDE SUPPORTS AND ADSORBENTS DERIVED THEREFROM FOR CARBON DIOXIDE CAPTURE

FIELD OF THE DISCLOSURE

The present disclosure relates to stabilized inorganic oxide supports and adsorbents for carbon dioxide capture from gases, particularly from flue gases, and a method for the preparation of stabilized inorganic oxide supports or adsorbents.

DEFINITIONS OF TERMS USED IN THE SPECIFICATION

The expression 'support' used hereinafter in the specification refers to but is not limited to an 'adsorbent'.

The expression 'carbon dioxide capture/capturing' used hereinafter in the specification refers to but is not limited to 'adsorption of carbon dioxide'.

The term 'pore volume' is defined as the ratio of a porous material's air volume to a porous material's total volume.

The term 'pore size distribution' is defined as the relative abundance of each pore size in a representative volume of a porous material.

The term 'pore volume incipient wetness impregnation technique' describes a technique used for the synthesis of heterogeneous catalysts. A metal precursor is dissolved in an aqueous or organic solution which is then added to a catalyst support containing the same pore volume as the volume of the solution that is added. The solution is impregnated into the pores by capillary action. The catalyst is then dried to remove the volatile components from the porous catalyst support, depositing the metal on the catalyst surface.

BACKGROUND

Average atmospheric concentration of carbon dioxide has steadily climbed up from pre-industrial levels of 280 ppm a century ago to over 390 ppm in 2010. The atmospheric carbon dioxide levels are increasing continuously due to rapid industrial growth worldwide to meet the ever increasing demand for energy. Major industrial sites like power plants, oil refineries and other processing plants such as cement, steel, and aluminium cause most of the carbon dioxide emission into the environment. The increased level of atmospheric carbon dioxide is considered to be one of the causes for global warming. In order to combat global warming, implementation of several precautionary measures such as the use of low carbon or carbon free energy sources like nuclear and wind, and other alternative methods such as capture and sequestration of carbon dioxide have been encouraged in recent years. Carbon dioxide capture combined with sequestration seems to be the most promising means for regulating carbon dioxide emissions today as the world is moving towards low carbon or carbon free energy resources.

EXISTING KNOWLEDGE

Among the various post combustion carbon dioxide capture methods, for example, solid adsorption, solvent adsorption, membrane and cryogenic separation, the solid adsorption route is more advantageous due to its enhanced carbon dioxide capture capacity, lower regeneration energy and low operational cost which provide easy retrofit to existing technologies.

The use of solid dry regenerable chemisorption route offers a huge potential for selective uptake and release of carbon dioxide. However, the major disadvantages allied with the chemisorption route reported hitherto are the poor regeneration characteristics of the adsorbents such as high regeneration temperature and poor multi-cycle adsorption capacity. The main reason for high regeneration temperature is the formation of stable intermediate species on the surface of the adsorbent during the carbon dioxide chemisorption which requires a high temperature for complete decomposition thereof. (For example, the formation of stable species like $KAl(CO_3)_2(OH)_2$ on the surface of the potassium salt bearing adsorbent)

Therefore, there is a need felt to provide stabilized supports and adsorbents derived therefrom for carbon dioxide capture which minimizes/prevents the formation of stable intermediate species during carbon dioxide capture thus requiring a considerably lower temperature for complete regeneration thereof and which offers extended life cycle for continuous operation.

OBJECTS

Some of the objects of the present disclosure are described herein below:

It is an object of the present disclosure to ameliorate one or more problems of the prior art or to at least provide a useful alternative.

Another object of the present disclosure is to provide a stabilized inorganic oxide support useful for preparing an adsorbent for capturing carbon dioxide from a variety of gases.

Still another object of the present disclosure is to provide a stabilized inorganic support useful for preparing an adsorbent for capturing carbon dioxide from a variety of gases wherein the formation of stable intermediate species on the surface of the adsorbent reduces significantly during carbon dioxide capture.

Yet another object of the present disclosure is to provide a stabilized inorganic support useful for preparing an adsorbent for capturing carbon dioxide from a variety of gases wherein the stabilized support has an extended life for continuous operation and demonstrates stabilized adsorption capacity for carbon dioxide during multiple adsorption-regeneration cycles.

A further object of the present disclosure is to provide a method for preparing a stabilized inorganic oxide support.

A still further object of the present disclosure is to provide an adsorbent derived from a stabilized inorganic support useful for capturing carbon dioxide from a variety of gases wherein the adsorbent demonstrates excellent regeneration properties and stabilized adsorption capacity for carbon dioxide during multiple adsorption-regeneration.

A yet further object of the present disclosure is to provide an adsorbent useful for capturing carbon dioxide from a variety of gases wherein the regeneration of the adsorbent is carried out at considerably low temperature thus reducing the energy demand.

Another object of the present disclosure is to provide a method for preparing an adsorbent useful for capturing carbon dioxide from a variety of gases.

Other objects and advantages of the present disclosure will be more apparent from the following description when read in conjunction with the accompanying figures which is not intended to limit the scope of the present disclosure.

SUMMARY OF THE INVENTION

The problem associated with the supports used for preparation of $CO_2$ adsorbent in the prior art is that the carbon dioxide adsorption capacity of the regenerated support is significantly diminished or reduced to use them commercially. The present invention addresses this problem by providing a method for preparing a support for $CO_2$ adsorbent which possesses significant carbon dioxide adsorption capacity with extended life span up to 11 cycles.

The present invention relates to a method for preparing a stabilized inorganic oxide support for capturing carbon dioxide from gases, said method comprising the following steps:

a. stabilizing at least one alumina-containing precursor selected from the group consisting of gamma alumina, silica-alumina, boehmite, pseudoboehmite and gibbsite by thermally treating said alumina-containing precursor to obtain a stabilized alumina-containing precursor having at least one form selected from the group consisting of gamma, eta, theta, delta and alpha;

b. impregnating at least one alkali or alkaline earth compound into the stabilized alumina; and c. drying the alkali or alkaline earth compound impregnated stabilized alumina to obtain a stabilized inorganic oxide support.

Optionally, the method includes a pre-step of impregnating the alumina containing precursor with at least one alkali metal by treating the alumina containing precursor with an alkali hydroxide at a temperature in the range of 20 to 50° C., preferably from 20 to 30° C., for a time period in the range of 10 to 20 mins and dried in an oven for a time period of 10 to 24 hours, preferably 12 hours, at a temperature in the range of 80 to 140° C., preferably 120° C. before subjecting the alumina-containing precursor to stabilization. The form conversion of the alumina-containing precursor during the stabilization is believed to play a vital role in deciding the carbon dioxide adsorption capacity of the support.

The carbon dioxide adsorption capacity of the fresh support is in the range of 95% to 98% with respect to theoretical carbon dioxide adsorption capacity, whereas the carbon dioxide adsorption capacity of the regenerated support is in the range of 70% to 85% with respect to theoretical carbon dioxide adsorption capacity. The carbon dioxide adsorption capacity of the regenerated support which is prepared by the method of the present disclosure is at least 3.5 times more efficient as compared to that of the carbon dioxide adsorption capacity of the known supports.

BRIEF DESCRIPTION OF THE ACCOMPANYING DRAWINGS

Figure 2:
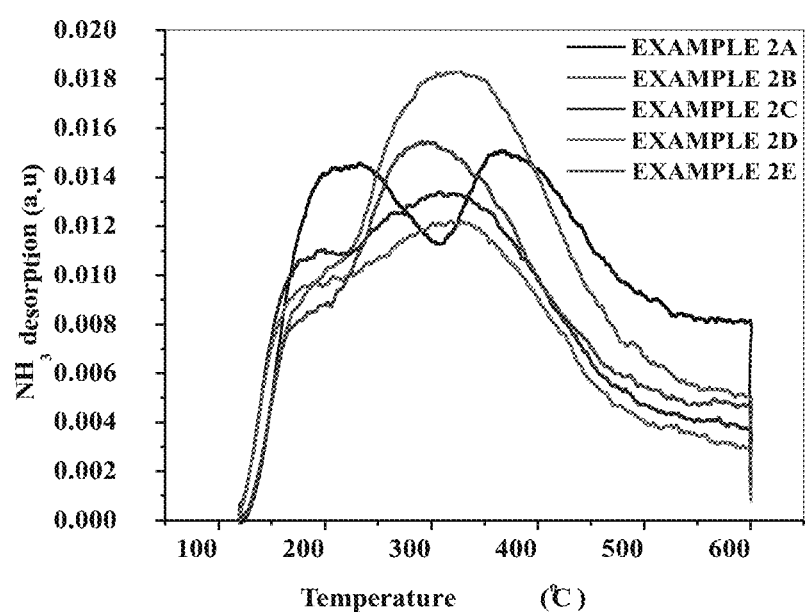
Figure 3:
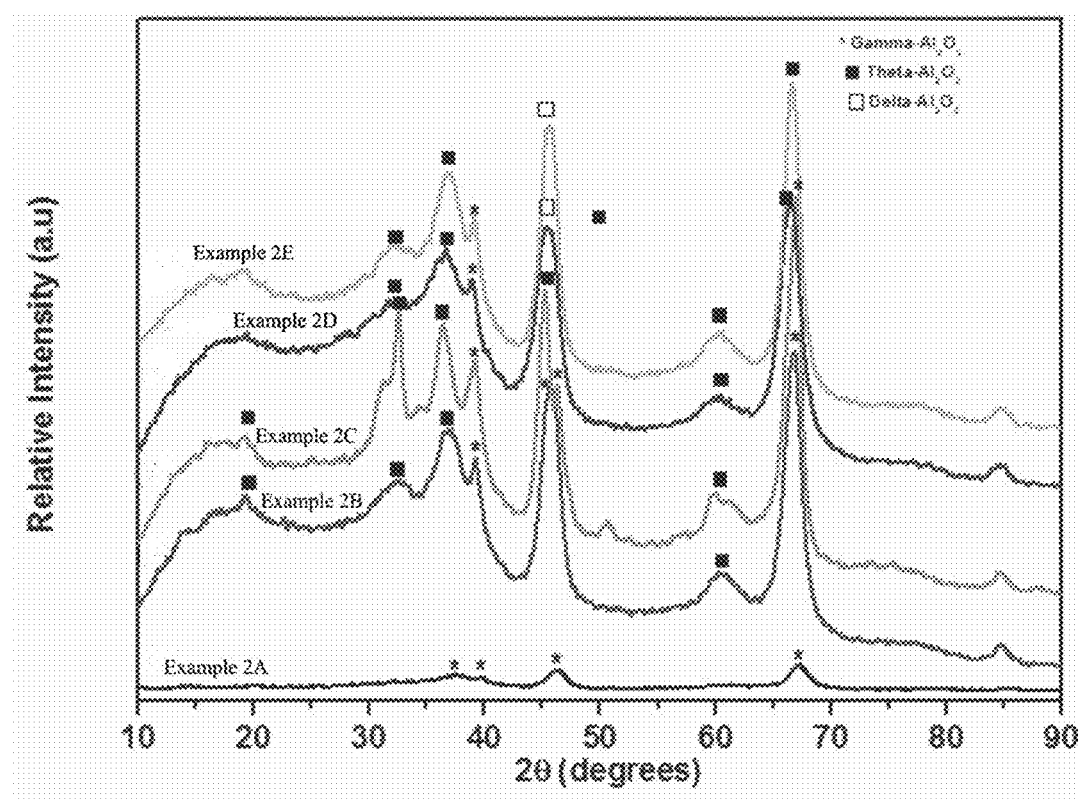
Figure 4:
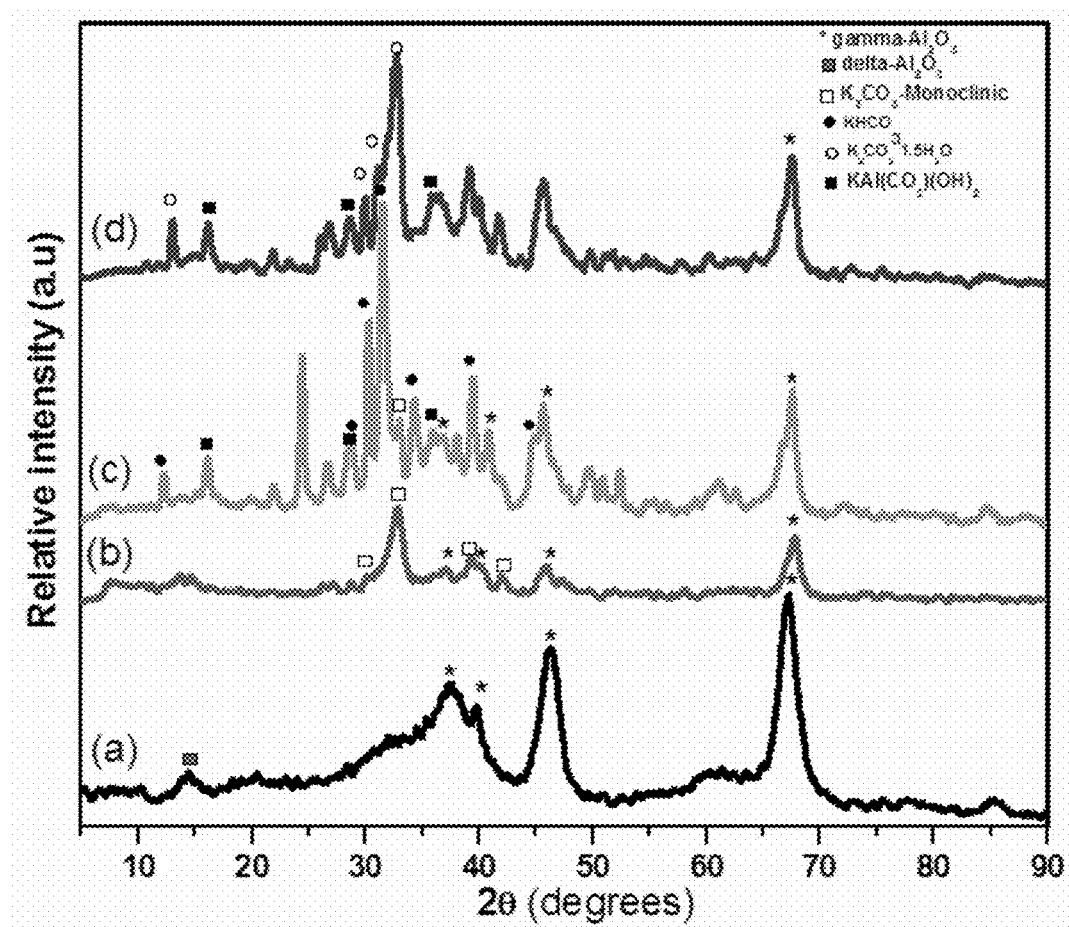
Figure 5:
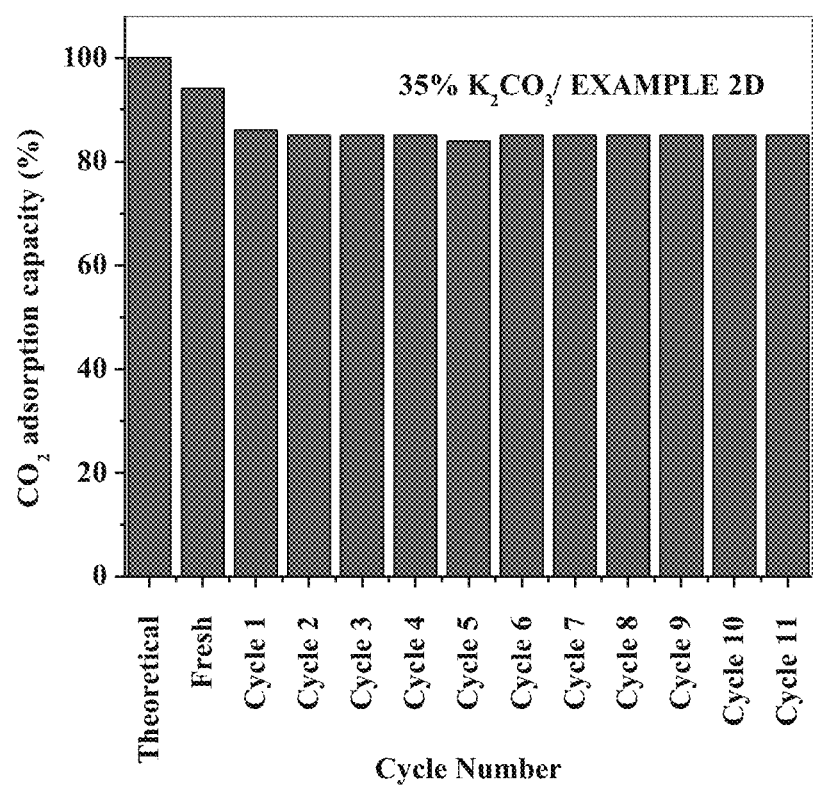

FIG. 1 one of the accompanying drawings illustrates pore size distribution (PSD) of stabilized alumina supports of examples 2A, 2B, 2C and 2D, and an adsorbent of example 2D comprising 35wt % of $K_2CO_3$ impregnated on the stabilized alumina support of example 2D, in accordance with the present disclosure;

FIG. 2 of the accompanying drawings illustrates temperature programmed desorption (TPD) of ammonia of stabilized alumina supports, in accordance with the present disclosure;

FIG. 3 of the accompanying drawings illustrates X-ray diffraction (XRD) of stabilized alumina supports, in accordance with the present disclosure;

FIG. 4 of the accompanying drawings illustrates X-ray diffraction of the followings: (a) a stabilized alumina support of example 2D; (b) an adsorbent of example 2D having 35% $K_2CO_3$ impregnated on the surface of the stabilized alumina support of example-2D; (c) an adsorbent of example-2D after carbon dioxide capture; and (d) after regeneration of the adsorbent of example 2D saturated with captured carbon dioxide, in accordance with the present disclosure; and FIG. 5 of the accompanying drawings illustrates multi-cycle carbon dioxide adsorption capacity of an adsorbent of example 2D, in accordance with the present disclosure.

DETAILED DESCRIPTION:

In one aspect, the present disclosure provides a stabilized inorganic oxide support useful for preparing an adsorbent for capturing carbon dioxide from a variety of gases. In another aspect, the present disclosure also provides a method for the preparation of the stabilized inorganic oxide support.

The stabilized inorganic oxide support in accordance with the present disclosure is an alumina-containing support comprising one or more alumina forms selected from the group consisting of gamma alumina, eta alumina, delta alumina, theta alumina, alpha alumina and silica-alumina.

In accordance with one of the embodiments of the present disclosure, the stabilized inorganic oxide support comprises at least one alumina form selected from the group consisting of gamma alumina, eta alumina, delta alumina, theta alumina and alpha alumina, preferably, alpha alumina. In accordance with another embodiment, the stabilized inorganic oxide support comprises silica-alumina.

The method for preparing the stabilized inorganic oxide support in accordance with the present disclosure, typically, comprises the following steps:

a. stabilizing at least one alumina-containing precursor selected from the group consisting of gamma alumina, silica-alumina, boehmite, pseudoboehmite and gibbsite by thermally treating said alumina-containing precursor to obtain a stabilized alumina-containing precursor having at least one alumina form selected from the group consisting of gamma, eta, theta, delta and alpha;

b. impregnating at least one alkali or alkaline earth compound into the stabilized alumina to obtain an alkali or alkaline earth compound impregnated stabilized alumina; and c. drying the alkali or alkaline earth compound impregnated stabilized alumina-to obtain a stabilized inorganic oxide support.

Optionally, alumina-containing precursor is impregnated with at least one alkali metal by treating it with an alkali hydroxide before subjecting the alumina-containing precursor to stabilization at a temperature in the range of 550° C. to 800° C. Non-limiting examples of alkali hydroxides suitable for the purpose of the present disclosure include sodium hydroxide. The gamma-alumina is treated with an alkali hydroxide solution at a temperature in the range of 20 to 50° C. for a time period in the range of 10 to 20 mins to obtain an alkali metal impregnated gamma-alumina. The alkali metal impregnated gamma-alumina is then dried at a temperature in the range of 80 to 140° C., preferably at 120° C. for a time period in the range of 10 to 24 hours, preferably 12 hours. In accordance with one of the embodiments of the present disclosure, the gamma-alumina is treated with an alkali hydroxide solution at a temperature in the range of 20 to 30° C. The drying of the alkali metal impregnated gamma-alumina is carried out in an oven for a time period of 12 hours at 120° C.

The alumina-containing precursor (gamma-alumina)/its alkali metal impregnated form is subjected to calcination for stabilization. The calcination of alumina-containing precursor is carried out in a manner effective to at least partially convert the alumina-containing precursor to a compound having at least one of the alumina forms selected from the group consisting of eta-alumina, delta-alumina, theta-alumina and alpha-alumina. In accordance with one of the exemplary embodiments of the present disclosure, the calcination of the dried alkali metal impregnated gamma-alumina is carried out at a temperature varying from 550 to 1100° C. in an oxidizing or an inert environment.

The stabilization of the alumina-containing precursor mainly includes optimization of the surface area, pore volume and surface hydroxyl concentration of the alumina-containing precursor, and also the optimization of octahedral $Al^{3+}$ species in the aluminum lattice by conversion of less stable tetrahedral $Al^{3+}$ species. The stabilization of the alumina-containing precursor in accordance with the present disclosure provides the stabilized support which minimizes the formation of stable intermediate species like $KAl(CO_3)_2(OH)_2$ to a significant extent on the surface of an adsorbent derived therefrom during the carbon dioxide capturing method. Due to less formation of stable intermediate species, the adsorbent can be regenerated at a lower temperature without destruction. Thus, the process provides the adsorbent with improved regeneration properties and stabilized adsorption capacity.

The selection of the stabilization method step in accordance with the present disclosure depends on the nature of the alumina-containing precursor used. Non-limiting examples of suitable alumina-containing precursors include boehmite, pseudoboehmite, gibbsite, one or more forms of alumina and silica-alumina. In accordance with one of the exemplary embodiments, the alumina-containing precursor comprises gamma-alumina. In accordance with another exemplary embodiment, the alumina-containing precursor comprises silica-alumina.

In accordance with one of the embodiments of the present disclosure, gamma-alumina is used as the alumina-containing precursor and the stabilized inorganic oxide support is obtained by the thermal treatment of the gamma-alumina. The thermal treatment typically includes calcination of the gamma-alumina. The calcination of gamma-alumina is carried out in a manner effective to convert at least a portion of the gamma-alumina to at least one alumina form selected from the group consisting of eta-alumina, delta-alumina, theta-alumina and alpha-alumina. In accordance with one of the exemplary embodiments of the present disclosure, the calcination of gamma-alumina is carried out at a temperature varying from 550 to 1100° C. in an oxidizing or an inert environment.

In accordance with one of the exemplary embodiments of the present disclosure, the alkali or alkaline earth compound used for the impregnation on stabilized alumina is potassium carbonate.

The calcination of alumina-containing precursor for stabilization is carried out at a temperature ranging from 550° C. to 1100° C., particularly in the range from 700° C. to 1100° C., more particularly in the range of 900° C. to 1100° C. in an oxidizing or inert environment whereas calcination of impregnated alumina-containing precursor for the stabilization is conducted at temperature in the range of 550 to 800° C.

The amount of alkali or alkaline earth compound in the stabilized inorganic support is in the range of 5 wt % to 60 wt %, particularly, 25 wt % to 40 wt %, the weights being expressed with respect to the total weight of the support.

The impregnation technique used for the impregnation of alkali or alkaline earth compound on the alumina-containing precursor is at least one selected from the group consisting of dry pore volume impregnation method and pore volume incipient wetness impregnation method. The impregnation technique used is pore volume incipient wetness impregnation technique During calcination, gamma-alumina is either fully or partially transformed into at least one alumina form. In accordance with one of the embodiments of the present disclosure, the stabilized inorganic oxide support obtained from calcination of gamma-alumina comprises gamma-alumina in combination with at least one alumina form selected from the group consisting of eta-alumina, delta-alumina, theta-alumina and alpha-alumina. In accordance with another embodiment of the present disclosure, the stabilized inorganic oxide support obtained from calcination of gamma-alumina comprises at least one alumina form selected from the group consisting of eta-alumina, delta-alumina, theta-alumina and alpha-alumina. In this embodiment, the alumina form other than gamma-alumina is dominant over the gamma-alumina form.

The stabilized gamma alumina support obtained in accordance with the method of the present disclosure is characterized in that the support exhibits a surface area ranging from 170 to 320 $m^2/g$; and pore volume ranging from 0.2 to 0.55 $cm^3/g$. The surface of the stabilized gamma alumina support is distributed partially or fully into gamma and delta alumina.

In accordance with another embodiment, silica-alumina is used as the alumina-containing precursor and the stabilized inorganic oxide support is obtained by the thermal treatment of the silica-alumina. The thermal treatment mainly includes calcination of silica-alumina. The calcination of silica-alumina is carried out at a temperature varying from 550 to 1100° C. In accordance with still another embodiment, silica-alumina is used as the alumina-containing precursor and the stabilized inorganic oxide support is obtained by steaming of silica-alumina. The steaming of silica-alumina is carried out at a temperature varying from 550 to 900° C. for a time period in the range of 8 to 18 hours in the presence of steam. Calcination and steaming of silica-alumina transform the silica-alumina into more crystalline form. The stabilized inorganic oxide support obtained by calcination and/or steaming of silica-alumina support may comprise at least one alumina form selected from the group consisting of eta-alumina, delta-alumina and theta-alumina.

The stabilized inorganic support further impregnated with alkali or alkaline earth compound for time period ranging from 10 to 24 hours followed by drying at a temperature in the range of 80 to 140° C., particularly at 120° C.

The stabilized inorganic oxide support obtained in accordance with the method of the present disclosure comprises less amount of surface hydroxyl concentration which attributes to fewer amounts of stable intermediate components formed during carbon dioxide capture. Further, the effective stabilization method also reduces the tetrahedral and more reactive $Al^{3+}$ species in the alumina lattice by converting them into stable octahedral $Al^{3+}$ sites.

The stabilized silica-alumina support obtained in accordance with the method of the present disclosure is characterized in that the support exhibits a surface area ranging from 200 to 550 m²/g; and pore volume ranging from 0.18 to 0.95 cm³/g. The surface of the stabilized silica alumina support is distributed partially or fully into delta and theta alumina. The average pore diameter of the stabilized support varies from 100 to 300 Å.

The stabilized support, in accordance with the present disclosure, is further characterized by an X-ray diffraction pattern for the identification of alumina forms transformed during the stabilization of the alumina-containing precursors and by temperature programmed desorption (TPD) of ammonia for measuring acid sites in terms of total acidity.

In a still another aspect, the present disclosure provides an adsorbent useful for capturing carbon dioxide from a variety of flue gases. The adsorbent useful for the purpose of the present disclosure comprises the stabilized inorganic oxide support impregnated with at least one alkali or alkaline earth compound.

Non-limiting examples of suitable alkali or alkaline earth compounds include alkali or alkaline earth carbonates, alkali or alkaline earth bicarbonates and alkali or alkaline earth oxides. In accordance with one of the exemplary embodiments of the present disclosure, the amount of the alkali or alkaline earth compound impregnated on the surface of the stabilized inorganic oxide support varies from 5 to 60 wt %, based on total weight of the adsorbent. In accordance with one of the exemplary embodiments of the present disclosure, the alkali or alkaline earth compound is potassium carbonate.

In a yet another aspect, the present disclosure provides a method for the preparation of the adsorbent useful for capturing carbon dioxide from a variety of flue gases. The method for preparing the adsorbent in accordance with the present disclosure comprises a method impregnating at least one alkali or alkaline earth compound on the surface of the stabilized support.

The impregnation of the alkali or alkaline earth compound on the surface of the stabilized support can be accomplished by a variety of suitable methods known in the related prior-art. Non-limiting examples of such impregnation method include pore volume incipient wetness impregnation method. In accordance with this method, a metal precursor is dissolved in water to obtain its aqueous solution. The metal precursor useful in the method of the present disclosure includes alkali or alkaline precursors. Non-limiting examples of suitable alkali or alkaline earth precursors are alkali or alkaline earth carbonates, alkali or alkaline earth bicarbonates and alkali or alkaline earth oxides. In accordance with one of the embodiments of the present disclosure, the alkali or alkaline earth precursor is potassium carbonate. To the aqueous alkaline solution thus obtained is then added the stabilized inorganic oxide support. The stabilized inorganic oxide support is allowed to dip in the aqueous alkaline solution for a pre-determined period of time and subsequently dried at a pre-determined temperature to obtain an adsorbent. The amount of the alkali or alkaline earth metal precursor impregnated on the stabilized support ranges from 5 to 60 wt % based on the total weight of the adsorbent.

The adsorbent in accordance with the present disclosure is used for capturing carbon dioxide from a verity of flue gases. The adsorption capacity of the adsorbent is at least 90% of the theoretical carbon dioxide adsorption capacity. The adsorbent in accordance with the present disclosure is capable of being regenerated at a considerably low temperature and is used further for capturing carbon dioxide gases. The regeneration of the adsorbent is typically carried out at a temperature ranging from 100 to 150° C. under inert gas flow. Further, the adsorbent in accordance with the present disclosure demonstrates stable adsorption capacity over multi-cycle adsorption-regeneration method. The adsorbent shows stable carbon dioxide adsorption capacity which is in the range of 70 to 90% of the theoretical carbon dioxide adsorption capacity.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

EXAMPLE 1

Measurement of $CO_2$ Adsorption Capacity:

An adsorbent was pretreated with 15 vol % water vapor for 10 minutes in an inert gas flow of 150 mL/min in a fixed bed reactor. The pretreated adsorbent was then adsorbed chemically with a simulated gaseous mixture containing 8 vol % of $CO_2$ at 55° C. till nearly complete saturation. The carbon dioxide saturated adsorbent was then heated at a temperature of 150° C. in the presence of an inert gas to regenerate the saturated adsorbent. The regenerated adsorbent thus obtained was further used for the capture of carbon dioxide.

EXAMPLE 2A

Unmodified Gamma Alumina Support:

Gamma alumina obtained from commercial source was impregnated with potassium carbonate by pore volume incipient wetness impregnation method to obtain an adsorbent. In a typical adsorbent preparation method, 50 g of gamma alumina dried at 120° C. overnight was added quickly to an aqueous solution containing of 30 g of $K_2CO_3$ in 30 mL of demineralized water at room temperature. The resultant mixture thus obtained was then dried under nitrogen flow followed by oven drying at 120° C. for 12 hr. The amount of $K_2CO_3$ impregnated on the surface of the gamma-alumina was determined by ICP analysis. The potassium carbonate loading was found to be around 37 wt %.

The $CO_2$ adsorption capacity of the fresh adsorbent and the stable adsorption capacity after multiple adsorption-regeneration cycle were also calculated in accordance with the procedure as described in Example-1, and found to be around 91% and 20% of the theoretical capacity, respectively. The temperature during $CO_2$ adsorption and regeneration of the adsorbent saturated with carbon dioxide was maintained at 55° C. and 130° C., respectively.

The gamma alumina was characterized for surface area, pore volume, pore size distribution, $NH_3$-TPD for acidity measurement, attrition index and form analysis. The results are tabulated in Table 1 (referred to data corresponding to Example 2A in table-1). The pore size distribution of gamma alumina was also illustrated in FIG. 1 of the accompanying drawings. The gamma alumina support exhibited $N_2$-surface area of 188 m²/, total surface acidity of 0.55 mmol of $NH_3$/g, pore volume 0.48 cm³/g and pore diameter 98 Å.

EXAMPLE 2B

Gamma Alumina Stabilized by Calcination at 700° C.:

The gamma-alumina of Example 2A was calcined at 700° C. for 6 hr under air/nitrogen flow. The stabilized gamma-alumina thus obtained was used as a support for the preparation of an adsorbent. The physicochemical and mechanical properties and form analysis of the stabilized gamma-alumina of this example is tabulated in Table 1 (referred to data corresponding to example-2B in table-1). After calcination at 700° C., a decrease in the total acidity of alumina was observed compared to the gamma alumina of example-2A, however pore diameter found to be increased about 19% (increased from 98 to 120 Å). Pore size distribution of the stabilized gamma-alumina of this example is also illustrated in FIG. 1 of the accompanying drawings. Calcination of gamma alumina resulted removal of free water, capillary water, interlayer water. The condensation of such water at high calcination temperatures contribute the increase in pore diameter, while decrease in surface area and pore volume indicates the structural changes of wall crystals. The decrease in surface acidity of stabilized gamma-alumina can be attributed to the thermal dehydration of hydroxyl group. Temperature programmed desorption of $NH_3$ for acidity measurement of the stabilized gamma-alumina is illustrated in FIG. 2 of the accompanying drawings. The alumina forms present in stabilized gamma-alumina of example 2B are a mix of eta and gamma alumina as shown in FIG. 3 of the accompanying drawings.

For the preparation of an adsorbent, 50 g of the stabilized gamma-alumina of this example was added to an aqueous solution containing of 26 g of $K_2CO_3$ in 27 mL of demineralized water at room temperature. The resultant mixture thus obtained was dried under nitrogen flow followed by oven drying at 120° C. for 12 hr. The amount of $K_2CO_3$ impregnated was determined by ICP analysis and the $K_2CO_3$ loading was found to be about 31wt %.

The $CO_2$ adsorption and regeneration studies of the adsorbent were performed by following the method described in Example 1. The adsorbent of this example showed $CO_2$ adsorption capacity of 98% and multi-cycle stable adsorption capacity of 71% of theoretical adsorption capacity. The adsorption and regeneration temperatures were maintained as described in example 2A.

EXAMPLE 2C

Gamma Alumina Stabilized by Calcination at 900° C.

Stabilization of gamma alumina of Example 2A was carried out in the same manner as described in Example 2B except the calcination temperature. The calcination temperature was maintained at 900° C. The stabilized gamma-alumina support thus obtained was used further preparing an adsorbent. In a typical preparation method, 65 g of the stabilized gamma-alumina of this example was added quickly to an aqueous solution containing 30.3 g of $K_2CO_3$ in 30 mL of demineralized water at room temperature. The resultant mixture thus obtained was dried under nitrogen flow followed by oven drying at 120° C. for 12 hr. The amount of $K_2CO_3$ impregnated was determined by ICP analysis and the $K_2CO_3$ loading was found to be 31wt %. $CO_2$ adsorption-regeneration studies were performed in a manner as described in Example-1. The adsorbent of this example showed fresh adsorption capacity of 98% and multi-cycle stable adsorption capacity of 78% of theoretical adsorption capacity.

The stabilized gamma-alumina support of this example was also characterized for its various physicochemical properties (referred to data corresponding to example 2C in Table-1). The total acidity of the stabilized gamma-alumina support of this Example is reduced by about 26% (0.55 to 0.41 mmol $NH_3$/g) and pore diameter increased about 74% (98 to 170 Å) compared to the stabilized alumina support of example 2A. The increase in pore diameter is attributed to crystallites formation. The pore volume distribution of the stabilized gamma-alumina support of this example is also illustrated in FIG. 1 of the accompanying drawings. The surface area also decreased drastically (from 188 to 100 m²/g) due to the changes in wall crystal structure. The alumina forms present in the stabilized gamma-alumina support of Example 2C are mainly delta alumina with traces of theta alumina (referred to FIG. 3 of the accompanying drawings for the X-ray diffraction of the stabilized gamma-alumina of example 2C).

EXAMPLE 2D

Gamma Alumina Stabilized by Calcination at 950° C.

Stabilization of the gamma alumina of Example 2A was carried out in the same manner as described in Example 2B except the calcination temperature. The calcination temperature was maintained at 950° C. The stabilized gamma-alumina support thus obtained was used for the preparation of an adsorbent. For this, 56.7 g of the stabilized gamma-alumina support obtained was added to an aqueous solution containing of 31.12 g of $K_2CO_3$ in about 32 mL of demineralized water at room temperature. The resultant mixture thus obtained was dried under nitrogen flow followed by oven drying at 120° C. for 12 hrs. The amount of $K_2CO_3$ impregnated was determined by ICP analysis and the $K_2CO_3$ loading was found to be about 35 wt %. The multi-cycle $CO_2$ adsorption-regeneration performance of the adsorbent of this example was conducted in manner as described in Example 1. The adsorbent of this example showed fresh $CO_2$ adsorption capacity of 95% and multi-cycle stable adsorption capacity of 85% of theoretical adsorption capacity (referred to FIG. 5 of the accompanying drawings for multi-cycle carbon dioxide adsorption capacity of the adsorbent of example 2D).

Further, FIG. 4 of the accompanying drawings illustrates comparative analysis of the X-ray diffraction of the adsorbent of example 2D before and after carbon dioxide capture, and also after regeneration of the adsorbent saturated with carbon dioxide. It is found from FIG. 4 that the formation of deactivating component like $KAl(CO_3)_2(OH)_2$ is very less in the adsorbent prepared by using the stabilized gamma-alumina support of example 2D after $CO_2$ adsorption and regeneration step.

The physicochemical and mechanical properties of the stabilized alumina support of this example are shown in Table 1 (referred to data corresponding to Example 2D in Table-1). It is observed that the total acidity is reduced about 38% and pore diameter increased about 82% compared to the stabilized alumina support of Example 2A (referred to FIG. 1 of the accompanying drawings for pore size distribution of the stabilized gamma-alumina support and the adsorbent comprising stabilized gamma-alumina support loaded with 35 wt % $K_2CO_3$). As the calcination temperature increases, the chemically bound interlayer hydroxyl groups are removed from the alumina resulting decrease in surface acid sites (referred to FIG. 2 of the accompanying drawings for temperature programmed desorption of ammonia). XRD analysis shows that the alumina forms present in stabilized gamma-alumina of Example 2D are a mix of delta and theta alumina (referred to FIG. 3 of the accompanying drawings).

EXAMPLE 2E

Gamma Alumina Modified by Alkaline Treatment Followed by Calcination at 700° C.

Stabilization of gamma alumina of Example 2A was carried out by alkaline treatment. In a typical stabilization method, 99 g of gamma alumina of Example 2A was added to an aqueous solution containing 1 g of NaOH in 79.2 mL of demineralized water at room temperature. The resultant mixture thus obtained was dried under nitrogen flow followed by oven drying at 120° C. for 12 hrs. The dried sample was calcined in a muffle furnace for 6 hr at 700° C. in air environment. The alkali stabilized alumina thus obtained was used as a support for the preparation of an adsorbent. For this, 50 g of alkali stabilized alumina was added to an aqueous solution containing of 27 g of $K_2CO_3$ in 27 mL of demineralized water at room temperature. The resultant mixture was dried under nitrogen flow followed by oven drying at 120° C. for 12 hrs. The amount of $K_2CO_3$ impregnated was determined by ICP analysis and the $K_2CO_3$ loading was found to be about 35wt %. The $CO_2$ adsorption-regeneration performance of the adsorbent of this example was evaluated in accordance with the procedure as described in Example 1. The adsorbent of this example showed $CO_2$ adsorption capacity of 98% and multi-cycle stable adsorption capacity of 70% with respect to the theoretical adsorption capacity.

The physicochemical and mechanical properties of the alkali stabilized alumina support of this example are tabulated in Table-1 (referred to data corresponding to Example 2E) After the alkali treatment the total acidity of gamma alumina is reduced by about 18% and pore diameter increased by about 13% compared to the unmodified alumina of Example 2A (referred to FIG. 2 of the accompanying drawings). The alumina forms present in the alkali stabilized alumina of this example are a mix of eta and gamma alumina as shown in FIG. 3 of the accompanying drawings.

EXAMPLE 2F

Silica-Alumina Modified by Steaming at 750° C.

The stabilization of silica-alumina (Si/Al ratio 0.66) obtained from Saint Gobain Siral 11/22 was carried out by steaming. For the stabilization of silica-alumina, 20 g of the silica-alumina was calcined in a fixed bed tubular reactor at 750° C. for 6 hrs and thereafter treated with 100% steam at 150° C. at 2 bar (absolute) for 12 hrs. The stabilized silica-alumina thus obtained was used as a support for the preparation of an adsorbent. For this, 7 g of the stabilized silica-alumina was quickly added to an aqueous solution containing of 7 g of $K_2CO_3$ in 13.2 mL of demineralized water at room temperature. The resultant mixture thus obtained was dried under nitrogen flow followed by oven drying at 120° C. for 12 hr. The amount of $K_2CO_3$ impregnated was calculated by ICP analysis and was found to be about 50 wt %. The $CO_2$ adsorption capacity was evaluated using adsorption-regeneration studies as described in Example 1. The adsorbent prepared in accordance with this example showed CO2 adsorption capacity of 98% and multi-cycle stable adsorption capacity of 81% of theoretical adsorption capacity.

The stabilized silica-alumina of this example was also characterized for its various physicochemical properties (referred to data corresponding to Example 2F in Table-1). After steaming, the total acidity is reduced up to 79% and pore diameter decreased up to 14% compared to the untreated silica-alumina. The surface area of the stabilized silica-alumina was reduced significantly about 56% while pore volume decreased up to 10%.

TABLE 1

Physicochemical properties of stabilized alumina and stabilized silica-alumina:

| EG. | Calcination/ Steaming Temperature (° C.) | Acidity (mmol $NH_3$/g) Weak | Acidity (mmol $NH_3$/g) Strong | Surface Area ($m^2$/g) | Pore Volume ($cm^3$/g) | Pore Diameter (Å) | AI (%) | XRD (Forms) | $CO_2$ CC | $CO_2$ CCR |
|---|---|---|---|---|---|---|---|---|---|---|
| 2A | — | 0.14 | 0.41 | 188 | 0.48 | 98 | 4.4 | Gamma | 91% | 20% |
| 2B | 700 | 0.13 | 0.40 | 152 | 0.45 | 120 | 4.8 | Eta, Gamma | 98% | 71% |
| 2C | 900 | 0.12 | 0.29 | 100 | 0.42 | 170 | 5.8 | Delta | 98% | 78% |
| 2D | 950 | 0.11 | 0.23 | 86 | 0.38 | 178 | 5.3 | Delta, Theta | 95% | 85% |
| 2E | 700 | 0.12 | 0.33 | 161 | 0.45 | 111 | 6.7 | Eta, Gamma | 98% | 70% |
| 2F | 750 | 0.10 | 0.08 | 228 | 0.29 | 172 | 53.2 | No XRD peaks | 98% | 81% |

$CO_2$CC: $CO_2$ Adsorption Capacity; $CO_2$CCR: $CO_2$ Adsorption Capacity after Regeneration Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Technical Advancements:

The present disclosure that relates to "stabilized inorganic oxide supports and adsorbents derived therefrom for carbon dioxide capture" has several technical advancements that include but are not limited to the realization of:

A stabilized inorganic oxide support which minimizes/reduces the formation of stable intermediate species like $KAl(CO_3)_2(OH)_2$ on the surface of the support during carbon dioxide capturing method thereby minimizing the energy required for the regeneration of adsorbents derived from the stabilized inorganic oxide support, and An adsorbent derived from the stabilized inorganic oxide support useful for capturing carbon dioxide from flue gases that demonstrates stabilized adsorption capacity for carbon dioxide capture during multiple adsorption-regeneration, The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

While considerable emphasis has been placed herein on the preferred embodiments, it will be appreciated that many embodiments can be made and that many changes can be made in the preferred embodiments without departing from the principles of the disclosure. These and other changes in the preferred embodiments as well as other embodiments of the disclosure will be apparent to those skilled in the art from the disclosure herein, whereby it is to be distinctly understood that the forgoing descriptive matter to be implemented merely as illustrative of the disclosure and not as limitation.

The invention claimed is:

1. A method for preparing an adsorbent for capturing carbon dioxide from gases, said method comprising the following steps:
   a. stabilizing at least one alumina-containing precursor selected from the group consisting of gamma-alumina, silica-alumina, boehmite, pseudoboehmite and gibbsite by thermally treating said alumina-containing precursor to obtain a stabilized alumina-containing support, wherein the thermal treatment is carried out using at least one technique selected from the group consisting of calcination and steaming;
   b. impregnating at least one alkali or alkaline earth compound into the stabilized alumina-containing support to obtain an alkali or alkaline earth compound-impregnated stabilized alumina-containing support, wherein the alkali or alkaline earth compound is at least one compound selected from the group consisting of alkali or alkaline earth carbonates, alkali or alkaline earth bicarbonates and alkali or alkaline earth oxides; and
   c. drying the alkali or alkaline earth compound-impregnated stabilized alumina-containing support, wherein the step of drying is carried out at a temperature in the range of 80° C. to 140° C., preferably at 120° C., to obtain the adsorbent; wherein the amount of alkali or alkaline earth compound impregnated in the stabilized alumina-containing support ranges from 5 wt % to 60 wt % of the total weight of the adsorbent.

2. The method of claim 1, wherein said stabilized alumina-containing support contains at least one alumina form selected from the group consisting of gamma, eta, theta, delta and alpha.

3. The method of claim 1, wherein said alumina-containing precursor is subjected to a pre-step of impregnation with an alkali metal, before subjecting said alumina-containing precursor to thermal treatment for stabilization, said pre-step comprising:
   treating said precursor with an alkali hydroxide, preferably sodium hydroxide, at a temperature in the range of 20 to 50° C., preferably 20 to 30° C., for a time period in the range of 10 to 20 min; and
   drying said alkali hydroxide treated precursor in an oven for a time period in the range of 10 to 24 hours, preferably 12 hours, at a temperature in the range of 80 to 140° C., preferably at 120° C. to obtain an alkali metal impregnated alumina-containing precursor.

4. The method of claim 3, wherein the thermal treatment of the dried alkali hydroxide treated alumina-containing precursor is carried out at a temperature in the range of 550 to 800° C.

5. The method of claim 1, wherein the calcination is carried out at a temperature in the range of 550° C. to 1100° C., preferably in the range of 700° C., to 1100° C., more preferably in the range of 900° C. to 1100° C. in an oxidizing or inert environment.

6. The method of claim 1, wherein the steaming is carried out at a temperature in the range of 550° C. to 900° C.

7. The method of claim 1, wherein the alkali or alkaline earth compound is alkali carbonate, preferably, potassium carbonate ($K_2CO_3$).

8. The method of claim 1, wherein the amount of alkali or alkaline earth compound impregnated in the stabilized alumina-containing support ranges from 25 wt % to 40 wt %, the weights being expressed with respect to the total weight of the support.

9. The method of claim 1, wherein the support has a surface area in the range of 170 to 550 $m^2/g$; pore volume in the range of 0.18 $cm^3/g$ to 0.95 $cm^3/g$; and pore size distribution in the range of 100 Å to 300 Å.

10. The method of claim 1, wherein the support has a surface area in the range of 170 to 220 $m^2/g$; pore volume in the range of 0.18 $cm^3/g$ to 0.95 $cm^3/g$; and pore size distribution in the range of 150 Å to 200 Å.

11. The method of claim 1, wherein the step of impregnating is carried out using a pore volume incipient wetness impregnation technique.

12. The method of claim 1, wherein the support possesses carbon dioxide adsorption capacity in the range of 95% to 98% of the theoretical carbon dioxide adsorption capacity.

13. An adsorbent prepared by the method of claim 1, wherein the adsorbent comprises;
   i) stabilized alumina-containing support having surface area in the range of 170 to 550 $m^2/g$; pore volume in the range of 0.18 $cm^3/g$ to 0.95 $cm^3/g$; and pore size distribution in the range of 100 Å to 300 Å; and
   ii) at least one alkali or alkaline earth metal precursor in an amount in the range of 5 to 60% based on the total weight of the adsorbent; wherein the at least one alkali or alkaline earth metal precursor is impregnated on the stabilized alumina-containing support;

wherein the fresh adsorption capacity of the adsorbent is at least 90% of the theoretical carbon dioxide adsorption capacity.

14. The adsorbent as claimed in claim 13, wherein the stabilized alumina-containing support has a surface area in the range of 170 to 220 $m^2/g$; pore volume in the range of 0.18 $cm^3/g$ to 0.95 $cm^3/g$; and pore size distribution in the range of 100 Å to 300 Å.

15. The adsorbent as claimed claim 13, wherein the stabilized alumina-containing support has a surface area in the range of 170 to 220 $m^2/g$; pore volume in the range of 0.18 $cm^3/g$ to 0.95 $cm^3/g$; and pore size distribution in the range of 150 Å to 200 Å.

16. The adsorbent as claimed claim 13, wherein the stabilized alumina-containing support has total acidity in the range of 0.18 to 0.53 mmol of $NH_3/g$.

* * * * *